Figure 1:
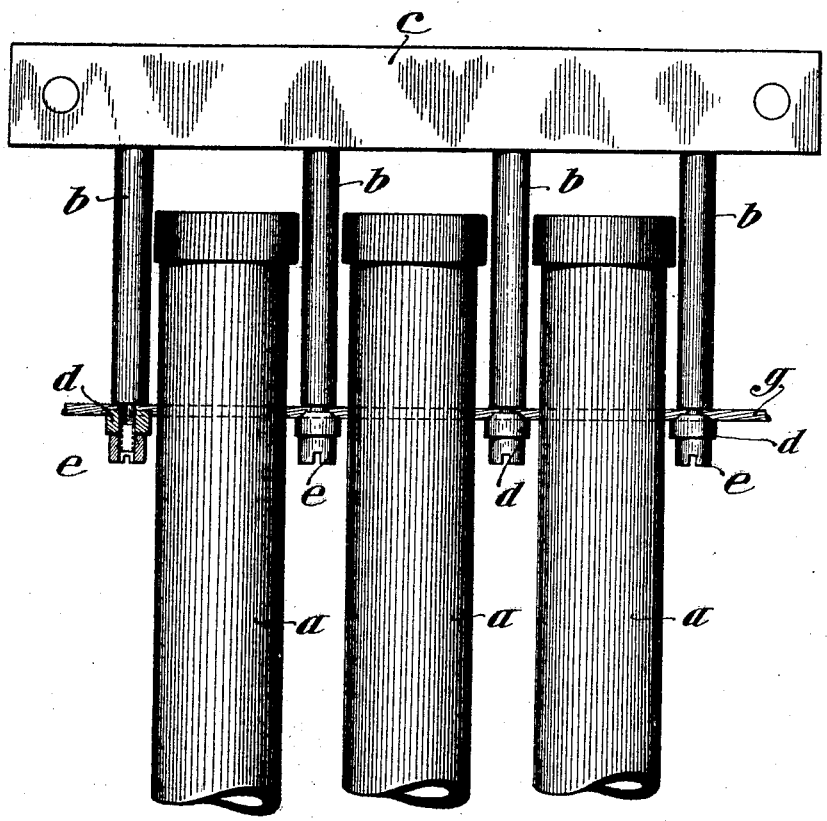

Feb. 3, 1925.

H. JUNGHANS

GONG TUBE FOR CLOCKS

Filed Sept. 5, 1924

1,524,975

Inventor:
Helmut Junghans

Patented Feb. 3, 1925.

1,524,975

UNITED STATES PATENT OFFICE.

HELMUT JUNGHANS, OF GUT BERNECK, NEAR SCHRAMBERG, GERMANY.

GONG TUBE FOR CLOCKS.

Application filed September 5, 1924. Serial No. 736,133.

*To all whom it may concern:*

Be it known that I, HELMUT JUNGHANS, a citizen of the German Republic, residing at Gut Berneck, near Schramberg, Germany, have invented certain new and useful Improvements in Gong Tubes for Clocks, of which the following is a specification.

Gong-tubes employed in clocks are usually suspended by means of a cord passing through transverse holes of the tubes and through holes of a suspending means intermediate between each two adjacent tubes, whilst the ends of the cords are fixed by knots tied therein.

Suspensions of the stated kind are objectionable for the reason that it is difficult to properly stretch the cord or to subsequently give the same any additional tension if desired or required.

My invention relates to gong-tubes for clocks and particularly to the suspension of the tubes. The object of my invention is to remedy the stated defects and with this object in view I suspend the gong-tubes in such a manner that each tube will be individually adjustable, as rgards its tension.

This result is obtained preferably by arranging each gong-tube intermediate between two suspension rods to which the tube holding cord is affixed by means of clamping rings and nuts, so that the cord will have attachments on both sides of each tube.

In the drawings forming a part of this specification an embodiment of my invention is illustrated by way of example.

Figures 2, 3:
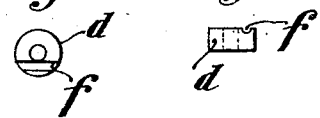

Referring to the drawings Figure 1 is a front view of tubes partly broken off at the bottom, with my improved suspension arrangement, Figure 2 is a lateral view of a clamping ring and Figure 3 is a plan view thereof.

As shown in the drawings the single gong-tubes $a$ are suspended by two vertically depending rods $b$ firmly connected to a suspension bar $c$ or the like. The lower and free ends of the rods $b$ are reduced in diameter to form pins and the extremities of said pins are threaded to receive nuts $e$, a clamping ring $d$ being applied to each pin so as to be interposed between the nut $e$ and the shoulder of the rod formed by the reduction of the rod to the shape of a pin.

The clamping ring $d$ is separately shown in Figures 2 and 3. The ring is preferably provided with a groove $f$ in its upper face and the depth of this groove is somewhat less than the thickness of the cord to be employed for the suspending purpose. The cord $g$ is threaded, as usually, holes being provided for the purpose in the walls of the gong-tubes diametrically opposite each other. After threading the cord is fixed to a rod $b$ at each side of the tube, by means of the described clamping ring $d$ and a nut $e$. In thus fixing the cord to the several rods care is to be taken that the rings $d$ are applied so as to have their grooves $f$ in alinement with the cord in order that the cord may snugly embed in said grooves and thus be prevented from accidental disengagement.

As will be readily understood from the above description of my improved construction each single gong-tube is adapted to be suspended individually or alone as a unit and the cord is adapted to be given any tension at any time as desired or required.

It will be evident that my invention, whilst still being adhered to in its main essentials, may be varied and adapted in many ways, according to requirements desired, or most suitable under different circumstances. Although I have herein shown and described only one form of suspending means, it is not to be inferred, that this is the only form in which my new device may be embodied, but it is a preferred form capable of clearly disclosing the principle of my invention.

What I claim is:

1. A gong-tube suspension for striking clocks comprising a series of gong-tubes, a series of vertically depending rods, a cord passing transversely through said tubes, and means for securing the said cord to the single rods with each tube located intermediate between two adjacent rods.

2. A gong-tube suspension for striking clocks, comprising a series of gong-tubes, a series of vertically depending rods having threaded ends, a cord passing transversely through said tubes, and clamping rings and nuts for securing the said cord to the ends of the rods, substantially as set forth.

3. A gong-tube suspension for striking clocks comprising a series of gong-tubes, a series of vertically depending rods having screw-threaded ends, clamping rings having each a groove, a cord passing transversely through said tubes, and nuts for securing the said cord embedded into the said grooves, to the threaded ends of the rods, substantially as set forth.

In testimony whereof I affix my signature.

HELMUT JUNGHANS.